United States Patent [19]

Kelley

[11] 4,150,214

[45] Apr. 17, 1979

[54] METHOD OF PREPARING CATALYST-FREE HIGH MOLECULAR WEIGHT POLYESTER

[75] Inventor: Mellis M. Kelley, Akron, Ohio

[73] Assignee: The Goodyear Tire & Rubber Company, Akron, Ohio

[21] Appl. No.: 877,456

[22] Filed: Feb. 13, 1978

[51] Int. Cl.² ............................................. C08G 63/70
[52] U.S. Cl. ..................................... 528/272; 528/480
[58] Field of Search ................ 260/75 M, 75 T, 75 R; 528/272, 480

[56] References Cited

U.S. PATENT DOCUMENTS

| | | | |
|---|---|---|---|
| 3,330,809 | 7/1967 | Perlowski et al. | 260/75 M |
| 3,475,379 | 10/1969 | Hilaire | 260/75 R |
| 3,497,477 | 2/1970 | Barkey et al. | 260/75 M |
| 3,594,350 | 7/1971 | Lofquist et al. | 260/75 R |

Primary Examiner—Lucille M. Phynes
Attorney, Agent, or Firm—J. P. Ward

[57] ABSTRACT

The invention relates to a process for preparing catalyst-free high molecular weight polyester resin by preparing a low polymer having an intrinsic viscosity of from about 0.1 to 0.4 said low polymer being essentially free of catalyst and polymerizing the low polymer under solid state polymerization conditions to form high molecular weight polyester.

3 Claims, No Drawings

METHOD OF PREPARING CATALYST-FREE HIGH MOLECULAR WEIGHT POLYESTER

This invention relates to a process for preparing a high molecular weight polyethylene terephthalate polyester polymer that has improved stability.

Heretofore it has been the practice to try to improve the stability of polyester resins by adding chemical stabilizers to such resins. In addition, materials are added which cap free carboxyl groups or otherwise reduce the amount of free carboxyl groups in the resin.

Now it is known that the presence of foreign materials affects resin stability and that catalysts that are effective in promoting esterification or transesterification and condensation and molecular weight build up also cause degradation reactions after polymer is made and put under stress such as exposure to heat or hydrolytic conditions. Some attempts have been made to eliminate these after effects of catalysts by adding materials that may form complexes with the catalyst residues and deactivate them.

In the prior art it has been suggested that in the esterification of terephthalic acid with glycol to form bis hydroxyethyl terephthalate or oligomers the esterification can be run without a catalyst (U.S. Pat. Nos. 3,050,533 and 3,427,287). However, in the preparation of polyester from dimethyl terephthalate by ester interchange or transesterification a catalyst is used to cause the glycol and dimethyl terephthalate to react in a reasonable time. Also, a condensation catalyst such as antimony trioxide or titanium glycolate had to be used to promote polymerization of bis hydroxyethyl terephthalate or oligomers to form high molecular weight polyester.

According to the present invention high molecular weight polyester resin free of catalyst can be made from dimethyl terephthalate by ester interchange and condensation when the ester interchange or transesterification reaction is carried out using a volatile catalyst which can be removed from intermediate molecular weight resin by heating and the condensation of such resin is accomplished by solid state process.

A. Preparation of Low Polymer

One hundred grams of dimethyl terephthalate was placed in a glass tube reactor containing 50 milliliters of ethylene glycol. One and one-half milliliters of benzyl trimethylammonium hydroxide was added as a transesterification catalyst. This mixture was melted at 150° C. Over the next three hours the temperature was raised in 5° to 10° increments until a final temperature of 235° C. was reached. At this point transesterification was complete as was indicated by the 40 milliliters of methanol collected as the by-product. The temperature was raised to 280° C. The pressure was gradually reduced with stirring over a time period of one hour and 15 minutes until a reading of 0.05 millimeter of mercury was reached. These conditions were maintained until the polymer started to become very thick and viscous (approximately 15 minutes). The reactor pressure was adjusted to atmospheric pressure. The low polymer was removed from the reactor by pouring into a container. The polymer was then cooled and ground to pass a 40 mesh screen. Benzyl trimethylammonium hydroxide is volatile and removed from the polymer at temperatures above 235° C. It had an intrinsic viscosity of 0.214 and a carboxyl number of 8 per $10^6$ grams.

B. Polymerization of Low Polymer

A sample of the low polymer was polymerized in a fluid bed reactor by passing preheated nitrogen through the polymer particles at a rate of 5 cubic feet per hour. Polymerization temperatures were 240° C. for 1½ hours; 245° C. for 1½ hours and 250° C. for 3½ hours. A catalyst-free polymer having an intrinsic viscosity of 0.740 (as determined in a 60/40 phenol/tetrachloroethane mixed solvent at 30.0° C.) and a carboxyl concentration of 3 per $10^6$ grams of polymer was obtained.

In the above example the resin was ground to pass a 40 mesh screen before it was subjected to solid state polymerization. Somewhat larger particles can be used. The particles will generally be in the range of from about 20 mesh to 40 mesh (U.S. Standard Screen) size.

In the example above benzyl trimethyl ammonium hydroxide was shown as a volatile transesterification catalyst. Other volatile catalysts can be used. Representative examples of such catalysts are benzoyl triethyl ammonium hyroxide and other amines having boiling points such that they can be removed from the polymer.

While certain representative embodiments and details have been shown for the purpose of illustrating the invention it will be apparent to those skilled in this art that various changes and modifications may be made therein without departing from the spirit or scope of the invention.

What I claim is:

1. The method of preparing a catalyst-free high molecular weight polyethylene terephthalate polyester which comprises preparing a low molecular weight polyethylene terephthalate polyester having an intrinsic viscosity of from 0.1 to about 0.4 and a free carboxyl group concentration of less than 25 equivalents per $10^6$ grams of polymer said low polymer being essentially free of catalyst subdividing said low polymer to pass a 40 mesh screen and subjecting said low polymer to solid state polymerization in a static bed process or fluid bed process to form high molecular weight polyethylene terephthalate.

2. The method of claim 1 in which the low molecular weight polymer is in the form of particles of 20 mesh size or less before being subjected to solid state polymerization.

3. The method of claim 2 in which the solid state polymerization process used is the static bed process.

* * * * *